United States Patent [19]

McEwen et al.

[11] Patent Number: 4,467,633
[45] Date of Patent: Aug. 28, 1984

[54] TROUGH, MANUFACTURING PROCESS, AND APPARATUS

[75] Inventors: Stephen N. McEwen; Robert L. Stevens; Barry R. Benschoter, all of Bowling Green; Robert F. Benschoter, Portage, all of Ohio

[73] Assignee: Henry Filters, Inc., Bowling Green, Ohio

[21] Appl. No.: 531,454

[22] Filed: Oct. 11, 1983

Related U.S. Application Data

[62] Division of Ser. No. 276,059, Jun. 22, 1981, Pat. No. 4,420,868.

[51] Int. Cl.³ .................. B21B 1/00; B21D 11/04; B21D 9/05
[52] U.S. Cl. .................. 72/203; 72/321; 72/388
[58] Field of Search .............. 72/51, 388, 306, 293, 72/321, 323, 203

[56] References Cited

U.S. PATENT DOCUMENTS

| | | | |
|---|---|---|---|
| 2,156,337 | 3/1939 | Hale | 72/133 |
| 2,276,012 | 3/1942 | Blackley | 72/219 |
| 2,339,355 | 1/1944 | Ruiten | 72/171 |
| 2,350,379 | 6/1944 | Weightman | 72/388 |
| 2,596,848 | 5/1952 | Green | 72/323 |
| 2,782,832 | 2/1957 | Shaw | 72/388 |
| 3,867,829 | 2/1975 | Bock | 72/321 |
| 4,070,890 | 1/1978 | Stubbings | 72/129 |

Primary Examiner—Howard N. Goldberg
Assistant Examiner—Steven E. Nichols
Attorney, Agent, or Firm—Hugh Adam Kirk

[57] ABSTRACT

The disclosure concerns a smooth continuous steel trough, free of longitudinal weld joints except for a flanged frame attached to its open top for supporting a cover grating. The apparatus for performing these steps comprises a conveyor table for moving and clamping a parallel edged sheet of steel while it is cut, such as by a torch, to predetermined length sides, and angled ends corresponding to the flow pitch for the resulting trough. The resulting isosceles trapezoidal section is then conveyed and aligned under an oscillatable convex mandrel or roller having a longitudinal clamping rib axially along its periphery for clamping the trapezoidal sheet near its center at the bottom of what is to be one of the equal side walls of the resulting trough. The conveyor and/or support for the sheet at the mandrel is vertically adjustable to compensate for different size mandrels and thicknesses of the sheets. Separate spaced manually-driven frictional rollers or tired wheels are hydraulically engageable to raise the plate and support it while under the mandrel, which wheels can be separately manually rotated for aligning the trapezoidal sheet with the mandrel before its longitudinal rib clamps the sheet against the supporting table. The free unclamped longer end of the sheet is then wrapped around the mandrel by a freely rotatable roller revolvable on adjustable parallel arms. The resulting sections are then placed in a rack or jig with their equal adjacent sides aligned for welding into a sub-assembly.

12 Claims, 10 Drawing Figures

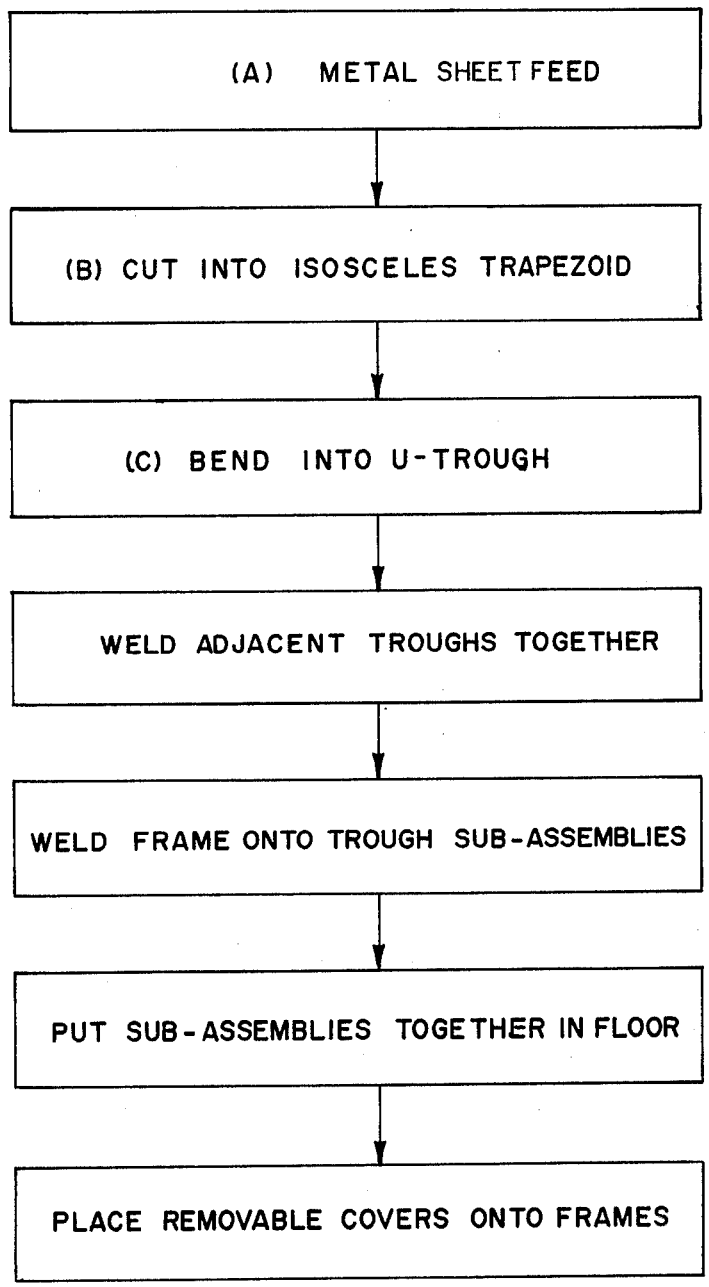
Fig I

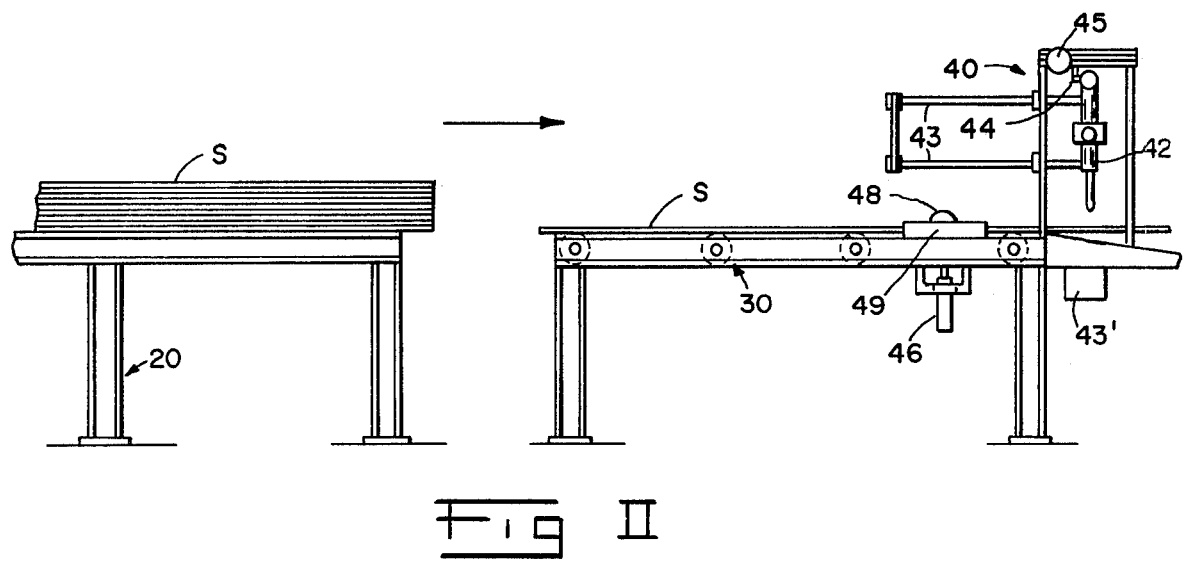
Fig II
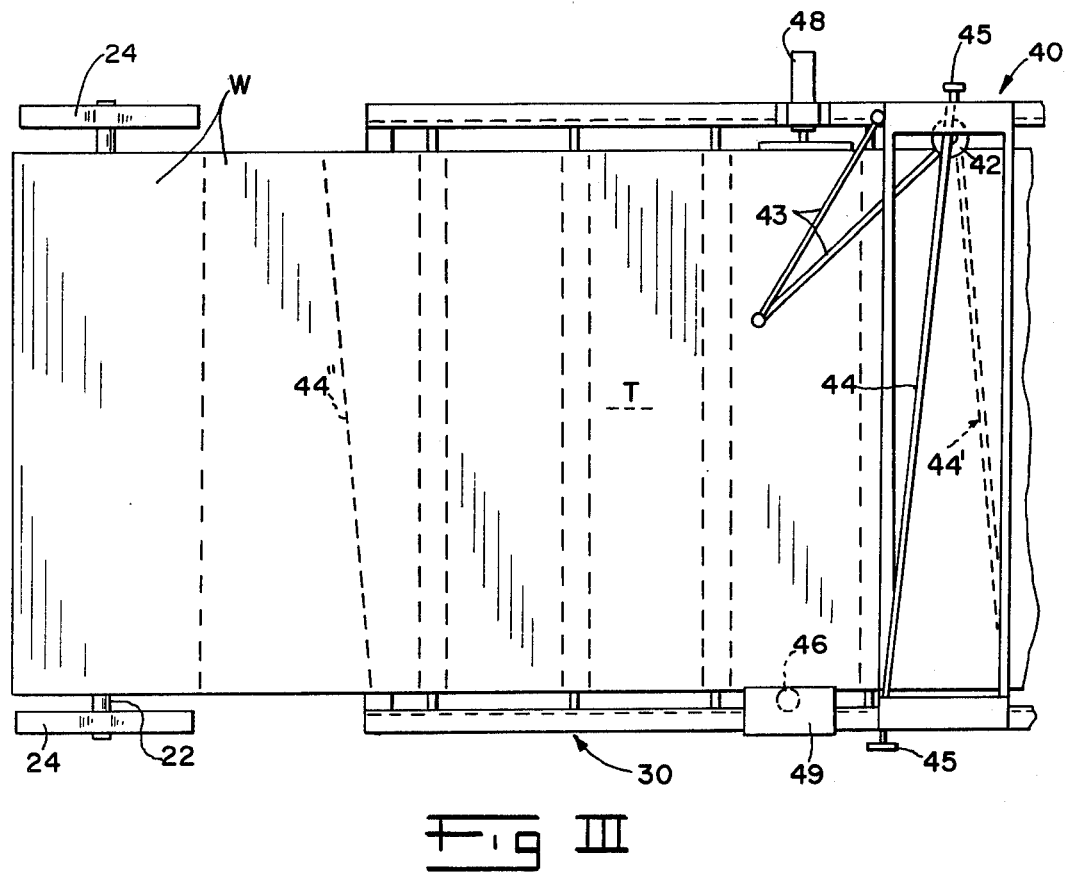
Fig III

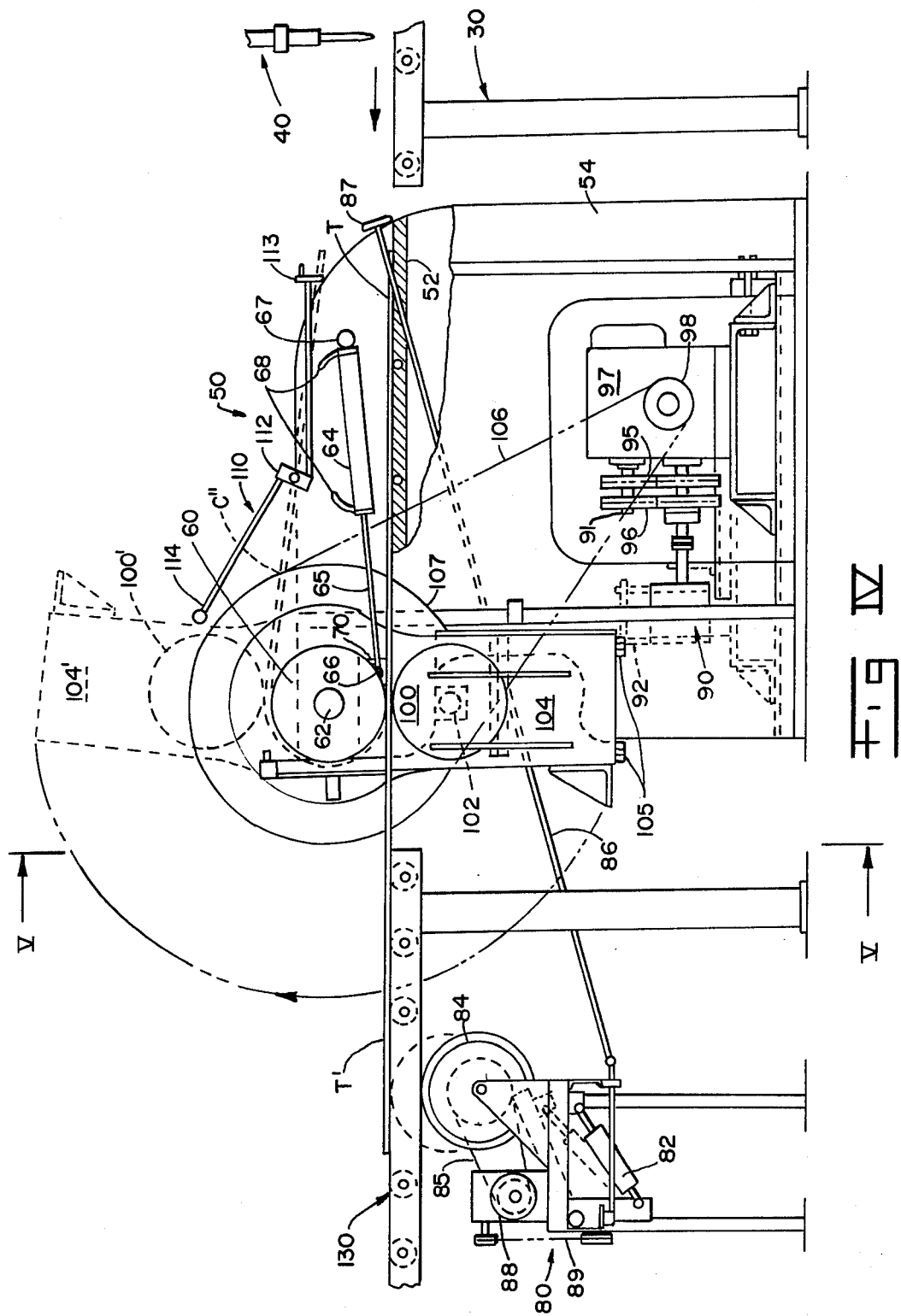

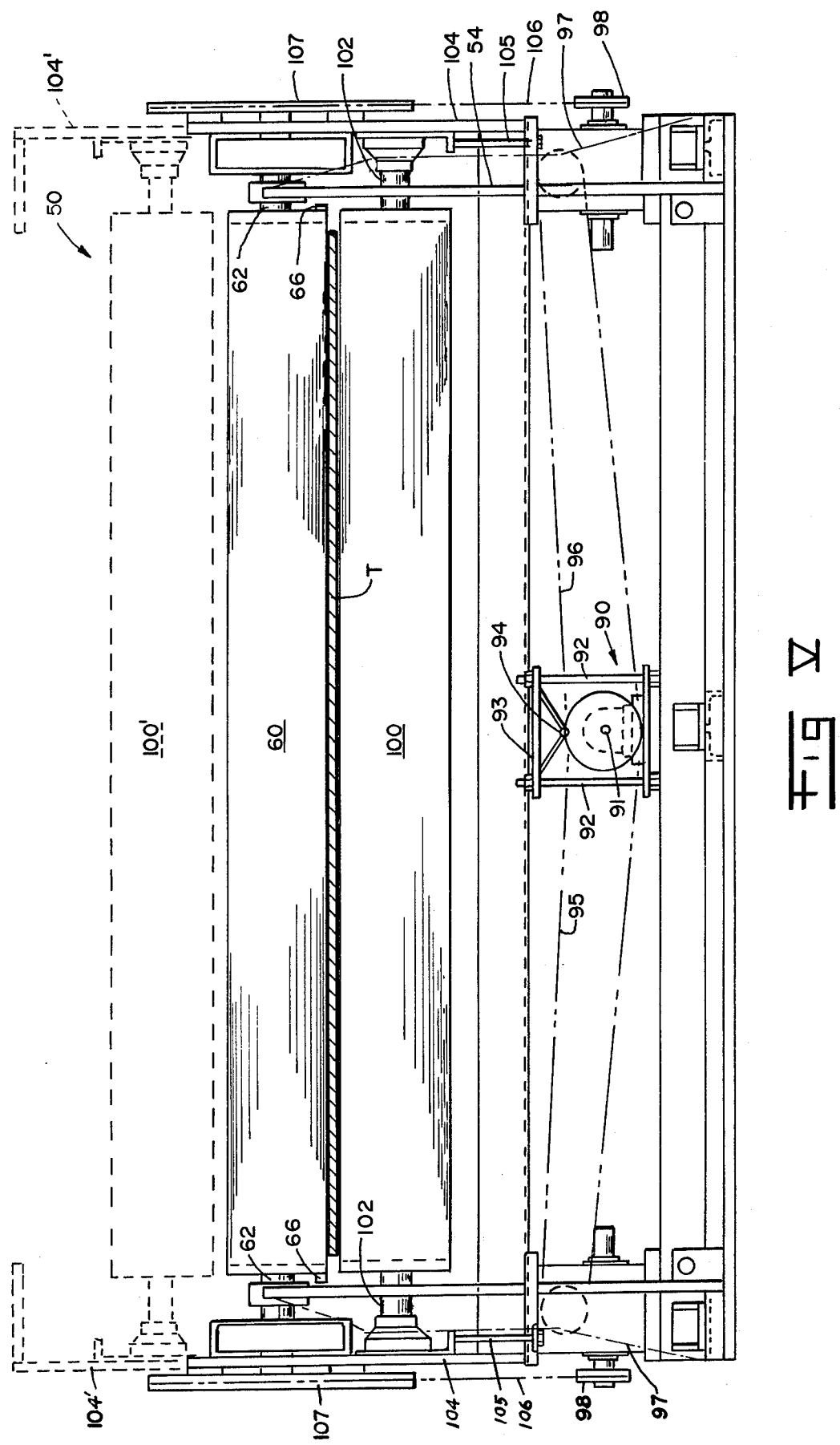

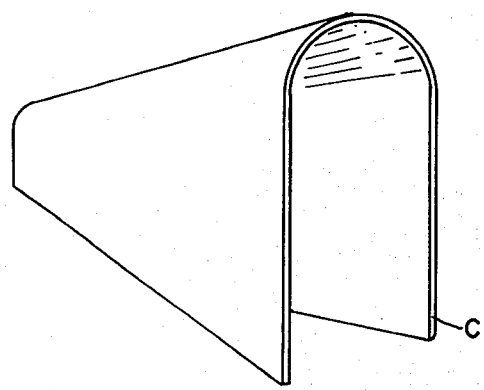
Fig VI
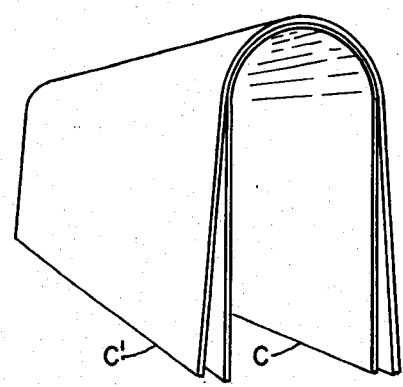
Fig VII
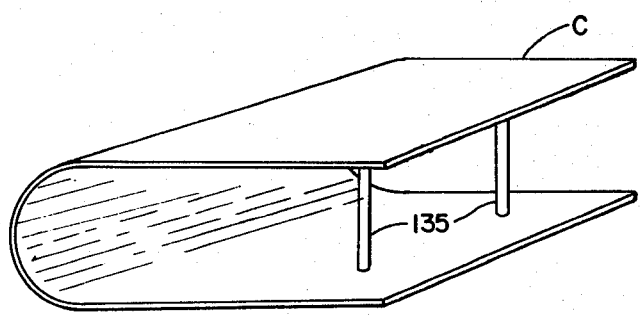
Fig VIII
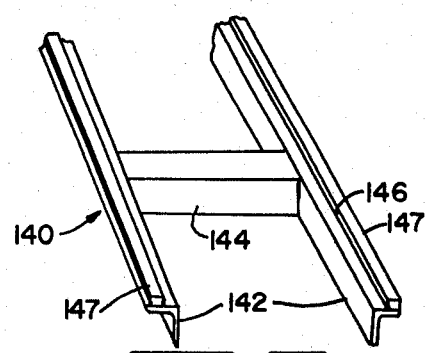
Fig IX
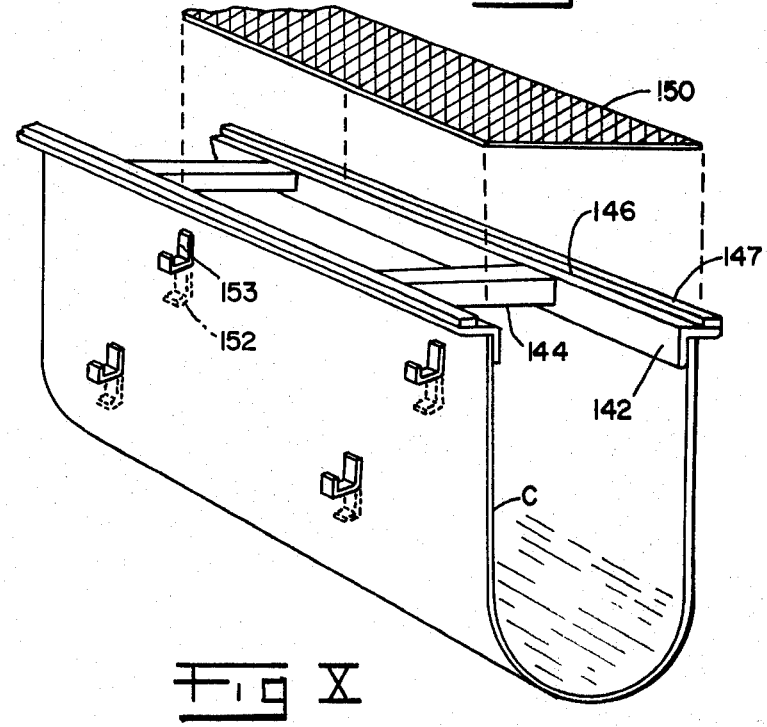
Fig X

TROUGH, MANUFACTURING PROCESS, AND APPARATUS

This is a division of application Ser. No. 06/276,059 filed June 22, 1981, now U.S. Pat. No. 4,420,868.

BACKGROUND OF THE INVENTION

Previously, such U-shaped trough sections were formed either by rolling a plate back-and-forth between three rollers, or breaking it successively to form a bend. Troughs with long sides or deep troughs could not be formed in this manner because the sides became so unwieldy in the multi-operations of increment bends until a U-shape was obtained. If shallow U-bends were first formed and then angular sides were welded thereon to provide for the pitch of the resulting trough, this took time, and was expensive and did not produce smooth and uniform troughs.

It is known, however, that machines combining a precutting of a sheet or web at an angle and then wrapping it around a mandrel by a roller to form a curved piece are known as shown in:

Hale U.S. Pat. No. 2,156,337 issued May 2, 1939 in Class 153-66 Rutten U.S. Pat. No. 2,339,355 issued Jan. 18, 1944 in Class 153-2.

Also it is known to cut sheets into trapezoidal shapes by means of cutting torches as shown in:

Stubbings U.S. Pat. No. 4,070,890 issued Jan. 31, 1978 in Class 72-129.

The roll-bending of clamped sheets by a freely movable roller mounted on a lever arm is also known as shown in the following U.S. patents:

Crowell U.S. Pat. No. 478,090 issued July 5, 1892
Swoboda et al U.S. Pat. No. 691,205 issued Jan. 14, 1902
Blackley U.S. Pat. No. 2,276,012 issued Mar. 10, 1942 in Class 153-46
Weightman U.S. Pat. No. 2,350,379 issued June 6, 1944 in Class 153-46.

There are also hydraulic means for bending plates as disclosed in U.S. patents to:

Green U.S. Pat. No. 2,596,848 issued May 13, 1952 in Cl. 153-46
Bock U.S. Pat. No. 3,867,829 issued Feb. 25, 1975 in Cl. 72-321.

The roll-bending of tubes around mandrels is known as disclosed in U.S. patents to:

Gail U.S. Pat. No. 957,200 issued May 10, 1910
Shaw Jr. U.S. Pat. No. 2,782,832 issued Feb. 26, 1957 in Cl. 152-46.

Vertically adjustable movable rollers for aligning articles for a machine is known in Gier U.S. Pat. No. 1,129,663 issued Feb. 23, 1915.

A common central drive for two parallel shafts is known from:

Wolfram U.S. Pat. No. 2,962,910 issued Dec. 6, 1960 in Cl. 74-230.17.
Drachman U.S. Pat. No. 2,571,427 issued Oct. 16, 1951 in Cl. 254-167.

No combination of these patents, however, discloses applicants' steps of cutting and successively joining equal length sides of isosceles trapezoidal sheets to form a smooth trough sub-assembly, nor do they disclose some of the detailed features of applicants' bending machine, such as the specific means for adjusting a sheet with respect to a mandrel, the hydraulically clamping of the sheet by oscillation of the mandrel, and the balanced single-motor drive for two spaced arms that support the wrapping roller around the mandrel.

SUMMARY OF THE INVENTION

The U-shaped trough produced by the process and apparatus of this invention comprises a smooth single sheet of steel having gradually increasing depth or height parallel equal sides and a smooth round U-shaped bottom, the open top of which is provided with a flanged frame for maintaining the parallel spacing of the sides and for providing a seat for removable gratings. The outside of this trough may be coated with a rust-resisting coating and its parallel vertical walls may be provided bendable L-shaped tabs which when bent outwardly from their tacked ends to provide locking anchors in the concrete in which the troughs are embedded. These troughs may be used for many purposes, but preferably have a pitch so that liquids therein will have a natural gravity flow from one end of the trough to the other, such as for the gravity and/or jet urged movement of contaminated coolant to a separator in a metal-machining factory.

The method for producing this trough comprises generally the steps of: cutting an isosceles trapezoidal sheet from a strip or web of steel with a pair of opposite parallel side edges, clamping this isosceles trapezoidal sheet near its center transversely of its parallel side edges and along the bottom of one of its resulting U-shaped sides, wrapping the longer free portion of the trapezoidal plate around a convex mandrel to form a smooth U-shaped section with sloping top edges and identical parallel sides, welding adjacent sections together along their equal length adjacent parallel side edges, that is, the base of one trapezoid to the top of the next successive trapezoid to form a sub-assembly trough, and finally welding to the open top of this sub-assembly trough a flanged frame to maintain the parallelism of the sides and also provide a seat for a grating cover. The parallel outside surfaces of the troughs may have tacked thereon L-shaped brackets which may be bent outwardly to form right-angled hooks for locking the trough in the concrete in which it is embedded. Preferably at least the outer surfaces of the trough are coated with a rust-resistant coating before being embedded in the concrete.

The apparatus for performing these steps comprises a supply of steel sheets, either from a stack of flat sheets or a roll or web of steel, with parallel side edges, which web or sheets are fed, such as on a roller conveyor table, to a cutter which cuts the sheets transversely to form the converging or diverging ends and side edges of isosceles trapezoidal sheet sections, so that the base of one trapezoidal section is equal in length to the top of the next adjacent trapezoidal section. The sheet or web is clamped both along and between its parallel edges while the cutter is in operation, which cutter may be a shear or a cutting torch, such as a plasma arc torch, which torch guides itself along a pre-adjusted transverse track set according to the angle of pitch of the flow of the resulting trough.

After the two ends of the sheet are cut to form the isosceles trapezoidal section, this section is conveyed further on a conveyor roller-type table which may be vertically adjustable to compensate for different thickness sheets and different size mandrels, to underneath the mandrel, such as a cylinder provided with a longitudinal peripheral axially extending rib, which rib may be oscillated about a longitudinal axis of the mandrel by means of a pair of hydraulic cylinders on opposite sides of the sheet and ends of the mandrel to engage the top of the trapezoidal section sheet along the bottom edge of one of the resulting parallel sides of the trough section, and clamp it rigidly against the supporting table. Before the rib on the mandrel clamps the trapezoidal sheet section, it is essential that the sheet be properly aligned, which may be manually done by the operators of the machine, by hydraulically lifting a separated pair of antifriction tired wheels or rollers for supporting the sheet on each side thereof so that one or the other may be manually rotated to move the sheet angularly with respect to the mandrel for proper alignment thereof.

An oscillating planetary freely-rotatable roller mounted between parallel radially adjustable lever arms at each end of the mandrel, then wraps the unclamped longer portion of the trapezoidal sheet section around the mandrel to form in one operation a smooth uniform and continuous U-shaped bend in the center of the section to form a trough section, regardless of the height of its equal sides forming the legs of the "U". The limits of oscillation of the two parallel arms may be adjusted by a manual sensing switch, and usually the bend is slightly more than 180° in order to compensate any natural spring-back or resiliency in the sheet and to form stationary parallel sides for the trough section. The drive for the two parallel arms of the wrapping roller is by a central single hydraulic reversible motor which is vertically and pivotally suspended between the arms. This motor drives through two oppositely extending toothed belts or sprocket chains identical gearing mechanisms adjacent each of the lever arms to oscillate the two arms in substantially identical sequence to insure the uniform smooth U-shaped bend in the resulting product.

After the wrapping roller is returned or retracted, the resulting U-shaped bent sheet section or trough section is unclamped by reversing the oscillation of the mandrel rib, so the trough section can be withdrawn from the mandrel on a further roller conveyor table, and then placed in a jig so that the adjacent equal length edges of successive trough sections may be welded together to form a trough sub-assembly of several U-shaped bent trough sections which have uniform U-shaped bends with a continuous smooth contour.

Frames having flanged edges and stepped seats then may be welded to the upper open end of the sub-assembly trough walls. There also may be welded to the outside parallel walls of the sub-assembly, and particularly the higher walls, L-shaped brackets tacked at one outer end of one of their legs, so that they may be bent outwardly when ready to be set in concrete for anchoring the walls in the concrete. Before the sub-assemblies are shipped to be installed, they also are preferably coated with an anti-rust material.

OBJECTS AND ADVANTAGES

It is the object of this invention to produce an accurate and smooth U-shaped steel trough from a single sheet of steel with relatively long parallel sides or legs by a new and improved simple, efficient, effective, and economic method and machine.

Another object of this invention is to provide a machine which produces consistent, uniform and integral smoothly curved U-shaped bends in the center of sheets with long sides up to say about twenty feet in length with semi-cylindrical bend diameters from about eight to about twenty inches.

Another object is to provide a simple, efficient, effective, accurate, and adjustable machine for carrying out the steps for producing such a U-shaped trough section which comprises cutting the sheets into isosceles trapezoids in which each successive sheet has one parallel side equal in length to a corresponding opposite parallel side of an adjacent trapezoidal sheet, and in which the angle of which converging or diverging end side edges correspond to the gravity flow pitch to be provided in the resulting trough for liquid transported therein.

Another object is to provide such a machine which is adaptable and adjustable to bend U-shaped trough sections of different widths and different convex shapes, as well as different thicknesses of steel sheets.

Still another object is to produce such a machine in which the opposite ends of the wrapping roll for bending the sheet around a relatively fixed convex mandrel are substantially completely synchronous in their operation being driven by a single motor and two gear mechanisms including flexible links having equal tension insured by the floating mounting of the intermediate motor.

BRIEF DESCRIPTION OF THE VIEWS

The above mentioned and other features, objects and advantages and manners of attaining them are described more specifically below by reference to embodiments of this invention which are shown in the accompanying drawings, wherein:

FIG. I is a schematic block diagram of the steps of the process of this invention;

FIG. II is a side elevational view of the first two major steps of the process of this invention of feeding, clamping and cutting a sheet into an isosceles trapezoidal sheet section;

FIG. III is a plan view of FIG. II showing another means of feeding the sheet, namely a web from a roll, and also showing the adjustable guide for cutting the angular end side edges of the isosceles trapezoidal sheet section;

FIG. IV is a side elevation, with parts broken away, of the trapezoidal sheet section bending machine, with the bending lever shown in dotted lines in its full bending position, and with the plate-aligning means being shown in dotted lines in its plate-supporting and adjusting position;

FIG. V is a view taken along lines V—V of FIG. IV showing the outlet side of the bending machine and the drive for the levers of the wrapping or bending roller, showing the roller in dotted lines in its full bending position;

FIG. VI is a perspective view of a trough section bent in the machine shown in FIGS. IV and V;

FIG. VII is a perspective view similar to FIG. VI showing how trough sections may be nested together for shipping purposes;

FIG. VIII is another perspective view of a trough section similar to that shown in FIG. VI but with temporary spacers placed between its two parallel sides to prevent their collapse until properly assembled;

FIG. IX is a perspective view of a frame section which is to be welded onto the open top of a U-shaped trough; and FIG. X is a perspective view of a U-shaped trough with a frame as shown in FIG. IX welded in place thereon, and part of a grating spaced above the frame to be seated therein, and also several bent-up L-shaped locking lugs on the side wall of the trough ready for anchoring the trough into its embedding concrete.

DETAILED DESCRIPTION OF PREFERRED EMBODIMENTS

I. The Process

In FIG. I there is shown schematically the major steps in producing a trough in the floor for liquids such as a contaminated coolant solution from machining operations in a factory floor, a section of which troughing is shown in FIG. X. The steps of this process start out with a sheet of steel or other metal of which the trough is to be manufactured which may come in sheet form or may be taken from a reel or coiled web. The sheet or web usually comes in sheets about eight feet wide and ranges in thickness from about ⅛ inch up to ¼ inch or more. The sheet material is first fed in step (A) onto a horizontal table-type conveyor, such as comprising rollers, and fed into a cutter which cuts the opposite ends of each sheet to form an isosceles trapezoid in step (B), the angle of each end cut being equal to the pitch of the trough in the floor for the gravity flow of the liquid through it. One of the most important features of this process is that the trapezoids which are successively cut from the sheet material have one of their parallel sides equal to the opposite parallel sides of the next successive trapezoid, namely that the longer side in one trapezoid will be equal for attachment to the shorter side of the next, or vice versa. Thus a continuous succession of sloping trough sections can be formed which can be joined together to form sub-assemblies and then the whole trough, all having the same pitch and shape and size U-shaped bottom.

After these sheets are cut to form successively larger or successively smaller isosceles trapezoids, they are fed onto a continuation of the table-type horizontal roller conveyor to be bent in step (C) into the U-trough section by a single uniform wrapping movement of the longer portion of the trapezoid around a mandrel by a planetarily moving roller after the plate has been clamped by the mandrel against the table supporting the plate at what is to be the bottom edge of one of the resulting two equal sides of the trough.

Successive adjacent U-troughs thus bent are butt-welded together to form a sub-assembly of trough sections or a longer trough, and then a flanged frame is welded to the open top of this trough to insure parallelism of its two sides.

The trough sections and/or sub-assemblies are then shipped to the location where the trough is to be installed in the trenches dug for them in the floor. These sections and/or sub-assemblies are then welded together and set in the trenches with their top frames flush with the floor. In order to prevent later collapse of the deeper parallel sides of the trough, the outsides thereof may have angular locking strips which are embedded in the concrete used to fill the trenches and anchor the trough.

Preferably the outside of the trough and/or its sections are coated with an anti-rust or preservative coating.

Once the troughs are installed, removable grating covers are then put over the trough to prevent persons and objects greater than the size of the apertures in the grating from falling into the trough. These covers seat in stepped-down seats provided in the flanged frame.

It is to be understood that instead of welding adjacent sections together to form sub-assemblies, the sections may be nested as shown in FIG. VII, or have their longer parallel walls temporarily fastened together with spacers as shown in FIG. VIII for shipment to the site of installation, and there be assembled with each other and their frames.

II. Apparatus

The most important and unique apparatus for carrying out the process of this invention is herein employed in the first three steps (A), (B) and (C) of the process shown in FIG. I. The first two of these steps (A) and (B) are disclosed in FIGS. II and III, and the third step (C) is disclosed in the apparatus shown in FIGS. IV and V, with the resulting U-bend trough sections and their assemblies being attached together into a continuous covered trough employing standard-type coating and welding apparatus.

(A) Sheet Feed

Shown at the left in FIGS. II and III are shown two separate means or sources for the sheet material used in this invention. FIG. II shows a supply of flat stacked sheets S, which may be located on a table 20 if desired, while FIG. III shows a plan view of a coil or roll of steel web W mounted on a horizontal axle 22 with end supports 24. Either the sheet S or the web W is then fed onto a roller conveyor table 30.

(B) The Cutter

Between the ends of the conveyor table 30 there is provided an adjustable angle transverse cutter 40 which in this instance is shown to comprise a plasma arc torch 42 mounted on a pair of levers 43 which is guided across the sheet S or W at an angle $\alpha$ by an adjustable bar 44 against which the upper end of the torch assembly is guided, such as by a friction roller on a motor connected to the torch assembly. The angles $\alpha$ at which the bar 44 and 44' is set correspond to the pitch angle of the resulting trough section. This angle $\alpha$ is changed alternately from the full line position 44 to the dotted line position 44' shown in FIG. III so that the opposite ends 44 and 44" of the sheet S or web W are cut to form isosceles trapezoidal shaped sheets T with the shorter parallel side of one sheet being equal in length to the longer parallel side of the next successive sheet, or vice versa, which is measured by the operators of the apparatus.

Before the sheet is cut by the cutter 40 or torch 42, it is clamped in position, such as by a first hydraulic clamping means 46 which grabs each face of the sheet adjacent at least one parallel edge thereof, and also such as by a second hydraulic means 48 on one side edge of the sheet to clamp it against the stop 49 on the opposite side of the conveyor table 30. Thus the sheet S or W is held rigidly while the cutter 42 shapes it into an isosceles trapezoid. In FIG. II there is shown a quenching trough 43' below the nozzle of the torch 42 to catch any molten pieces of metal that may fall from the slit formed during the cutting operation. There are also shown in FIG. III clamping screws 45 at opposite ends of the guide bar 44 so that the operators standing on each side of the conveyor table can not only clamp the position of the bar 44 for the proper angle to the cut ends of the sheet S or W to form the isosceles trapezoids, but also to measure the relative opposite parallel sides so that the successive trapezoidal sections will accurately fit and abut each other when bent into the U-shaped trough shapes, such as shown in FIG. VI.

(C) The Bender

Referring now to FIGS. IV and V, the trapezoidal sheet T progresses along the roller table conveyor 30 from the cutting means 40 to the entrance table 52 of the bender 50, which table 52 preferably has ball bearings in its surface for easy movement and angular alignment of the trapezoidal sheet T. This table 52 is vertically adjustable to compensate for different thicknesses of the sheets T as well as for different diameters of the mandrel 60 around which the sheet T is bent into the dotted line trough shape C″ shown in FIG. IV. Although the mandrel 60 shown herein is a cylinder and it is mounted on an axle or trunnions 62 journalled in the frame 54, it is only slightly oscillatable in these trunnions by means of a pair of hydraulic cylinders 64 and their pistons 65 connected to pivots 66 at the periphery and each end of the mandrel 60. These hydraulic cylinders are supported by pivots 67 to the sides of the frame 54, and operated by hydraulic pressure through the conduits 68 connected to opposite ends of each cylinder 64 to oscillate the cylindrical mandrel 60 through a few degrees so that the longitudinal rib 70 welded to the outer surface of the mandrel between the piston 65 and pivots 66 can be moved downwardly against the top of the plate T to clamp it solidly against the table 52 when the plate T has been properly aligned with the mandrel 60 for bending the U-shaped trough bottom therein.

In order to properly align the trapezoidal plate T under the mandrel 60 before it is clamped by the rib 70 along the bottom edge of one of the parallel sides of the U-trough to be formed, there are provided a pair of adjusting devices 80 near each side of the plate T, or ends of the machine 50. The rubber-tired wheels or rollers 84 of these devices 80 may be raised by hydraulic cylinders 82 into the dotted line position shown in FIG. IV to engage and support the lower side of the plate T that extends on the opposite side of the mandrel 60 from the table 52. Then these supporting wheels 84 may be rotated through the drive connection shaft 86 and manual cranks or wheels 87 by the operator on that side of the bending machine 50, so as to align the plate T, if it becomes askew, to be exactly positioned before clamping by the rib 70 and any bending occurs. The rubber-tired wheel 84 may be driven by means of a belt or sprocket chain 85 through a worm gear arrangement 88 driven by belt or sprocket chain 89 from the end of the articulated drive shaft 86. This gear reduction mechanism enables accurate and minute adjustments for the alignment of the plate T in the bending machine 50.

As soon as the plate T has been properly aligned and clamped by oscillation of the mandrel 60, a planetary roller 100 wraps the longer free end T' of the plate T around the now stationary mandrel 60. The roller 100 is moved by a single centrally located reversible hydraulic motor 90 shown in FIG. V which is suspended between parallel vertical rods 92 from a vertically slidable platform 93 having a pivot 94 for support for the motor 90 parallel to the motor's drive shaft 91. Sprocket chains or toothed belts 95 and 96 extend in opposite directions from parallel gears on the shaft 91, both of which chains or belts 95 or 96 are maintained with the same tension in view of the balanced mounting of the motor 90, so that they will synchronously, accurately, simultaneously and identically drive the gearing mechanisms on opposite sides of the bender 50 through worm gears 97 and arm 104 to oscillate the freely rotatable wrapping roller 100 from its full line position shown in FIGS. IV and V to its dotted line position 100'. Its dotted line position 100' usually is slightly more than 180° from its full line position to be sure that after the roller 100 is retracted to its full line position again that the U-shaped bend in the trough plate T will not spread due to the resiliency of the sheet but maintain its two equal sides or logs of the "U" parallel as shown in FIG. VI. The amount of overbend, i.e. greater than 180°, can be readily adjusted and sensed by means of the lever mechanism 110 having a sensing arm 114 which is connected to the frame 54 through a pivoted microswitch 112 adjusted by crank wheel 113. This arm 114 is contacted by the oscillating lever arm 104 which mounts the opposite trunnion ends 102 of the wrapping roller 100. Thus the single balanced hydraulic motor 90 drives through the reduction gears 97 the sprocket wheels 98 which drive sprocket chains 106 connected to the large sprocket wheels 107 pivoted concentrically with the axis of the mandrel 60 and to which sprocket wheels 107 are anchored the variable radial arms 104. The reversible hydraulic motor 90 thus moves the arms 104 to push the wrapping roller 100 against the outside or bottom surface of the plate T and wrap it around the mandrel 60 to form a smooth continuous and constant bend therein to produce the channel section C″ shown in dotted lines in FIG IV. When the arms 104 reach their dotted line positions 104', the sensing switch 112 is operated to reverse the motor 90 to return the arms 104 back into their full line positions shown in FIGS. IV and V. These full line positions also may be defined by a similar sensor to that of 110 (not shown). An important feature of this particular apparatus is the single balanced hydraulic motor 90 which drives the two separate oscillating arms 104 in substantially exact unison. This would be very difficult to do by electrical means or separate hydraulic motor means or cylinders, because of the difficulty in balancing two motors and their overriding momentums.

Since different size and diameter mandrels 60 may be used, the bearings for the trunnions 102 of the wrapping roller 100 are radially adjustable by bolts 105 along the arms 104.

As soon as the trapezoidal sheet T is bent into a channel or trough section C, the hydraulic cylinders 64 are reversed to move the rib 70 into its plate-releasing position so that the trough section may be pulled or slid out of the machine and mandrel 60 to the left as shown in FIG. IV on another roller table conveyor 130.

(D) The Assembly

The rest of the apparatus which is employed in the assembly of the trough usually comprises primarily standard-type manual welding apparatus for welding the ends of the separate trough sections into elongated sections or sub-assemblies and a continuous trough. This can be done easily in that each section has exactly the same curvature for the base of its "U", and each section has an end edge which is exactly equal and congruent with an end edge of an adjacent trough section.

In order to insure that the parallelism of the sides of the final trough section C is maintained, a separate flanged frame 140 as shown in FIG. IX comprising parallel angle bars 142 and intermittant spacers 144, is welded inside of and between the tops of the legs or parallel sides of the trough sections C as shown in FIG. X. These angle bars 142 are provided with stepped seats 140, which may be formed by welding bars 147 to the outer upper flanges of the angle bars 142. These seats are for supporting the grating 150 (see FIG. X) flush with the top of the trough and the ground floor in which the trough is set. If the frames 140 are to be welded onto the trough section C after shipment, the sections C may be nested as shown in FIG. VII or have their parallel sides braced by temporarily welded spacers 135 as shown in FIG. VIII, in order to maintain their shapes during shipment.

Before the troughs are permanently installed in the ground or floor, there usually is provided, if the walls of the trough are relatively long, L-shaped locking brackets 152 as shown in FIG. X which may be spot-welded at the end of one of their "L" sides or legs, such as at 153 to the outside walls of the U-channel section C, which L-brackets are bent out into the position shown in full lines in FIG. X to provide anchors for these walls when the concrete is poured around the trench in the space between the trough and the trench in which they are set.

Also, it is advantageous, in view of the fact that these troughs usually are set into the ground, in order to protect the trough from rusting, at least their outside surfaces are coated with an anti-rust composition.

It is to be clearly understood that each of the major steps of the process may include several sub-steps such as for example the cutting step may include the steps of first clamping the plate before it is cut, adjusting the angle for the cutter, and then unclamping the plate after it has been cut. Similarly, the bending operation may include the additional steps of first aligning the plate in the bending machine, clamping it after it is aligned, and then after it is bent unclamping the plate. Furthermore, the assembly steps may also include the attachment of the locking tabs or brackets 153 as shown in FIG. X, the coating of at least the outside of the trough to prevent rusting, and the bending up of the locking brackets 153 before the concrete is poured around the trough.

It is to be understood that the cutting means 40 may comprise other than a cutting torch in that it may be a saw or a shear or other means which is adjustable to form the isosceles trapezoidal sheets T.

It is to be understood that although the mandrel 60 is shown cylindrical, it can have another shape, such as elliptical, provided it is convex. It also may have different sizes, for example the cylindrical mandrels may vary from say 8 inches in diameter to two feet in diameter, depending upon the width of the trough section C to be produced. The length of the U-shaped trough sections are at least twice the distance between its parallel sides.

While there is described above the observed principles of this invention in connection with specific apparatus, it is to be clearly understood that there may be unobserved side effects which contribute substantially to the efficiency of this device and that this description is made only by way of example and not as a limitation to the scope of this invention.

We claim:

1. A trough-forming machine comprising:
(A) a source of flat metal sheets having parallel sides,
(B) a horizontal conveyor means for feeding said sheets,
(C) means for intermittently clamping said sheets to prevent movement along said conveyor means,
(D) cutting means movable transversely of said conveyor means and said clamped sheets,
(E) means for adjusting the angle of said transverse movement of said cutting means to form isosceles trapezoidal-shaped sheets with converging end edges,
(F) a convex mandrel having means to clamp each said trapezoidal-shaped sheet intermediate its said converging end edges, and
(G) roller means for wrapping the unclamped major portion of said trapezoidal-shaped sheet around said mandrel to form a U-shaped trough with parallel equal sides.

2. A machine according to claim 1 wherein said conveyor means comprises a vertically adjustable roller table.

3. A machine according to claim 1 wherein said cylindrical mandrel has a clamping radial ridge, and includes means for oscillating said ridge.

4. A machine according to claim 1 including a pair of spaced drivable roller means to move said sheet at an angle of said mandrel and at an angle to said parallel sides of said conveyor means.

5. A machine according to claim 4 including means to raise and lower said roller means to support said sheet adjacent said mandrel.

6. A machine according to claim 1 including a single pivotally mounted vertically floating hydraulic motor means between the ends of said planetary roller means for driving gearing for simultaneously oscillating parallel arms journalling the ends of said planetary roller means.

7. A machine according to claim 6 including adjustable sensing means for limiting the degrees of oscillations of said arms.

8. A machine according to claim 1 wherein said means for intermittently clamping said sheets includes a separate means for clamping the sides and edges of said sheets.

9. A machine according to claim 1 wherein said cutting means comprises a plasma arc torch.

10. A machine according to claim 1 wherein said clamping means on said mandrel comprises a ridge extending longitudinally and parallel to the axis of said mandrel, and includes hydraulic means for oscillating said mandrel so said ridge clamps said sheet against its support.

11. A machine according to claim 1 wherein said planetary roller means is radially adjustable.

12. A machine according to claim 1 wherein said means for wrapping the unclamped major portion of the trapezoidal sheet around said mandrel comprises a planetary roller.

* * * * *

UNITED STATES PATENT AND TRADEMARK OFFICE
CERTIFICATE OF CORRECTION

PATENT NO. : 4,467,633

DATED : August 28, 1984

INVENTOR(S) : Stephen N. McEWEN et al

It is certified that error appears in the above-identified patent and that said Letters Patent are hereby corrected as shown below:

Column 10, line 33, change "1" to - - 12 - -.

Column 10, line 54, change "1" to - - 12 - -.

Signed and Sealed this

First Day of October 1985

[SEAL]

Attest:

Attesting Officer

DONALD J. QUIGG

Commissioner of Patents and Trademarks—Designate